United States Patent [19]

Cailbault

[11] Patent Number: 5,400,699

[45] Date of Patent: Mar. 28, 1995

[54] AUTOMATIC FOOD DISPENSER

[76] Inventor: Christian J. G. Cailbault, 57 rue de la Marcellière, 85100 Le Chateau d'Olonne, France

[21] Appl. No.: 94,320

[22] Filed: Jul. 20, 1993

[30] Foreign Application Priority Data

Jul. 29, 1992 [FR] France .................. 92.09360

[51] Int. Cl.⁶ .................................. A47J 43/00
[52] U.S. Cl. ........................... 99/357; 99/356; 99/289 T; 221/31; 221/72; 221/74; 221/150 A
[58] Field of Search ............... 99/356, 357, 407, 403, 99/289 R, 409, 411, 289 T; 221/30, 31, 72, 74, 150 A

[56] References Cited

U.S. PATENT DOCUMENTS

| 3,181,734 | 5/1965 | Ensign | 99/289 T |
| 3,224,361 | 12/1965 | Öjelid | 99/357 |
| 3,276,352 | 10/1966 | Allen et al. | 99/357 |
| 3,298,567 | 1/1967 | Hahn | 221/74 |
| 3,340,789 | 9/1967 | Simjian et al. | 99/352 |
| 3,817,422 | 6/1974 | Raitt | 221/74 |
| 3,984,030 | 10/1976 | Morini | 221/30 |
| 4,008,657 | 2/1977 | Yamamura et al. | 99/483 |
| 4,146,150 | 3/1979 | Low et al. | 221/30 |
| 5,029,520 | 7/1991 | Okada | 99/357 |

FOREIGN PATENT DOCUMENTS

| 1156814 | 5/1958 | France . |
| 1081403 | 8/1967 | United Kingdom . |
| 8912417 | 12/1989 | WIPO . |

*Primary Examiner*—Timothy F. Simone
*Assistant Examiner*—Reginald L. Alexander
*Attorney, Agent, or Firm*—Sandler, Greenblum & Bernstein

[57] ABSTRACT

An automatic food dispenser comprises an arrangement for feeding a chain of packages containing portions of food, an arrangement for opening said packages, a receptacle, a heating arrangement associated with the receptacle and an evacuation mechanism. It can be used for automatic dispensing of french fries.

12 Claims, 2 Drawing Sheets

AUTOMATIC FOOD DISPENSER

BACKGROUND OF THE INVENTION

1. Field of the Invention

The invention concerns an automatic food dispenser, specifically a new arrangement for dispensing portions of hot food without manual intervention. One specific application of the invention is for dispensing cooked potatoes in the form of french fries.

2. Description of the Prior Art

The automatic dispensing of hot dishes in public places raises numerous problems, especially in the case of foods which conventionally must be fried in oil, like french fries, for example. One of the problems to be solved is that of maintaining the cooking oil, controlling the cooking process and controlling the proportion of cooking oil in the foods dispensed. At present it is not feasible to envisage the entirely automatic dispensing of hot foods of this kind. It is also difficult to guarantee a constant quality of the dispensed food, even if cooking and dispensing are monitored by a staff member. On the other hand, it is a simple matter to conceive of large-scale production units in which product quality and cooking conditions are closely monitored by specialist staff to offer products of consistent quality prepared in a way that preserves their taste and like properties as much as possible. In the specific case of french fries it is possible to control closely the quality of cooking and the amount of fat tolerated in the cooked fries. It is known how to package precooked products of this kind using means such that the taste and other qualities can be preserved over a relatively long period.

The invention provides a new arrangement for the automatic dispensing of precooked products of this kind to be served hot without manual intervention.

SUMMARY OF THE INVENTION

The invention consists in a device for automatically dispensing packaged foods in individual portions enclosed in respective packages attached to each other in the manner of a chain, which device comprises means for feeding the chain along a predetermined path, means for opening said packages at a predetermined location along the path, a receptacle adapted to receive an individual portion from an opened package and heating means associated with the receptacle which comprises or is associated with an evacuation mechanism for transferring the heated portion to the location of a container.

The various means mentioned above are actuated sequentially, for example by motors and/or linear actuators controlled by a control signal from a coin receiver, a ticket receiver, a card reader or the like.

The electrotechnical components employed to actuate the various means mentioned above in sequence are regarded as known to the man skilled in the art but their overall combination is new. Various heating means may be used in a device of this kind. Hot air heating is often preferable. Induction heating is feasible.

In one specific embodiment, the packages comprise sachets fastened together end-to-end and the opening means comprise a cutting member disposed on the path of the chain so as to open the sachets above the receptacle. In a device of this kind it is necessary to provide a stack of empty trays and a dispenser for feeding these trays one after the other to a location at which successive portions are tipped into them after they have been processed by the heating means.

In another embodiment, the packages constituting the chain are trays linked together by a "peel-off" tape constituting lids for all the trays in the chain. In this case the opening means are adapted to detach the "peel-off" tape in conditions such that the foods are tipped into the receptacle to be processed by the heating means and said trays, once separated from each other, are fed to a location to receive heated foods.

In this case the trays in which the foods were packaged and stored are re-used for the hot food dispensed to the customer. It is not necessary to provide any stock of empty trays in the device itself.

The invention will be better understood and other advantages of the invention will emerge more clearly from the following description of two embodiments of a device for dispensing food in accordance with the invention given by way of example only and with reference to the appended non-limiting drawings.

DETAILED DESCRIPTION OF THE INVENTION

Figure 1:
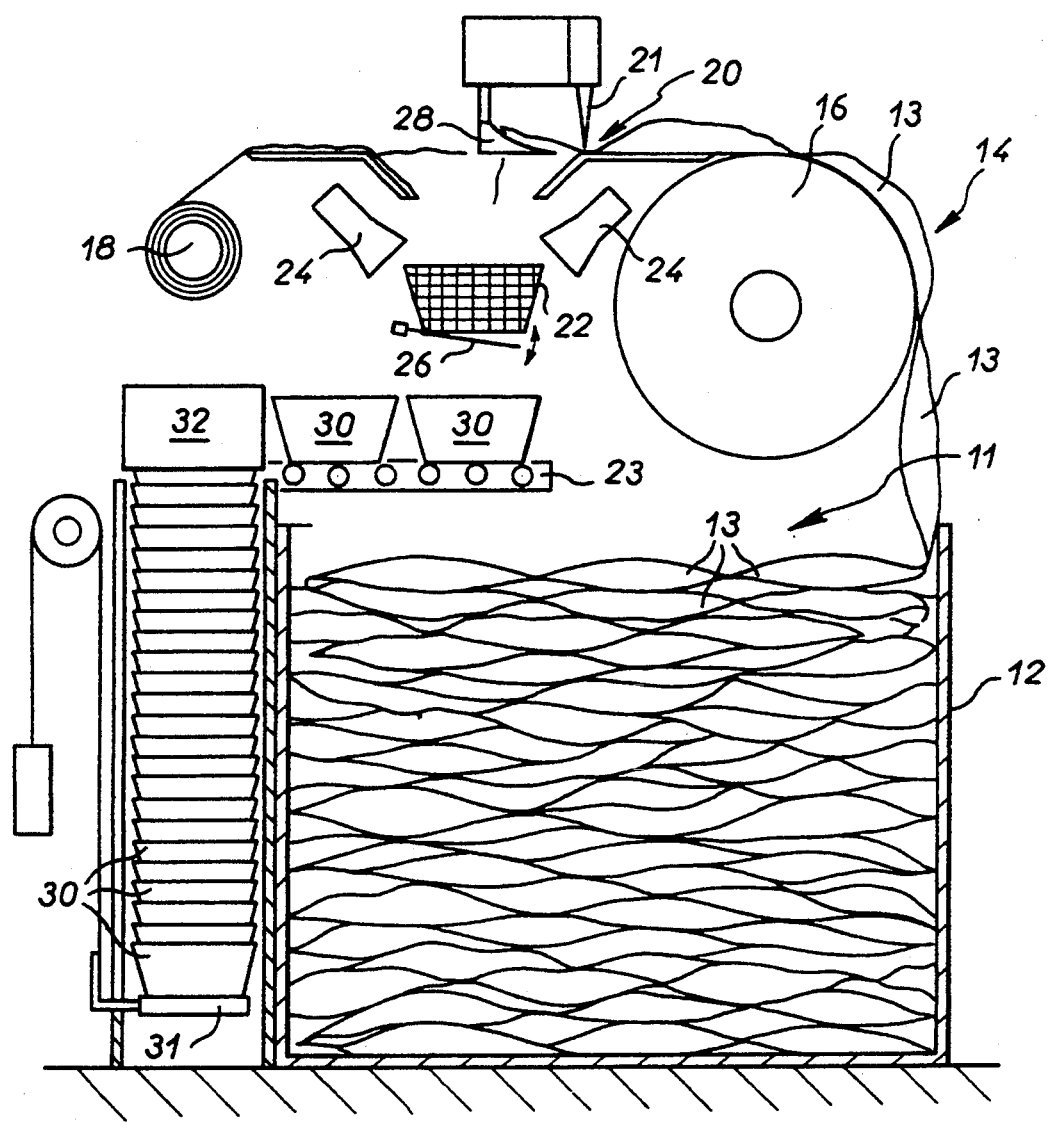
FIG. 1 is a diagrammatic elevation view of a first embodiment of a dispensing device in accordance with the invention.

The device for automatically dispensing food as shown in FIG. 1 comprises a housing 11 adapted to receive a container 12, a cardboard container, for example, containing a number of portions of french fries in respective packages 13 fastened together to constitute a kind of chain 14.

The portions are precooked and packaged in the manner shown in an industrial unit where high-performance equipment guarantees optimum cooking and packaging. When a container 12 containing a number of portions is placed in the dispenser the operator fits the chain onto a feed drum 16 and attaches its free end to a take-up drum 18 adapted to recover continuously what remains of the packages after they have been opened and the food has been extracted. The drums 16, 18 cause the chain of packages to move along a predetermined substantially horizontal path 20. Means 21 for opening the packages are disposed along this path.

In the FIG. 1 example, the packages 13 are sachets joined together necklace-fashion and the opening means may therefore comprise a simple cutting member such as a blade or the like positioned to slit the sachets open longitudinally as they move along the path. The cutting member is disposed so that opening a sachet causes the french fries to drop into a receptacle 22. The chain is advanced sequentially so that the receptacle receives only one portion at a time. Hot air heating means 24 associated with the receptacle comprise two hot air ejector nozzles directed towards the receptacle. The latter comprises or is associated with an evacuation mechanism 26 for transferring the heated portion of french fries to a location at which is positioned-a a container accessible to a consumer. The receptacle has a selectively openable bottom (operated by a solenoid or like system, not shown) forming part of the evacuation mechanism.

To make it easier to tip the french fries into the receptacle, deflectors 28 are provided above the receptacle to separate the two parts of the chain of packages resulting from longitudinal slitting of the sachets.

The take-up drum 18 recovers the remains of the sachets when emptied of their contents and still joined together end-to-end. A friction traction system may be provided on the upstream side of the drum 18 which is not indispensable. The dispenser is completed by a stack of empty trays 30 installed between a vertically mobile base 31 and an unstacker-dispenser 32 known, per se feeding the trays one by one along a horizontal guide 23 to a location under the receptacle 22 where each tray may receive a portion of hot french fries.

This location is naturally behind an opening in the housing of the dispenser to enable the consumer to take out the tray filled with a portion of french fries.

Maintaining a dispenser as described above entails only periodic provision of a container 12 containing a chain of sachets and a stack of empty trays 30.

Each time the dispenser is replenished the remains of the empty sachets are naturally removed from the take-up drum 18. To facilitate this the drum 18 has a telescopic hub receiving a disposable cardboard tube onto which the sachets are wound.

Figure 2:
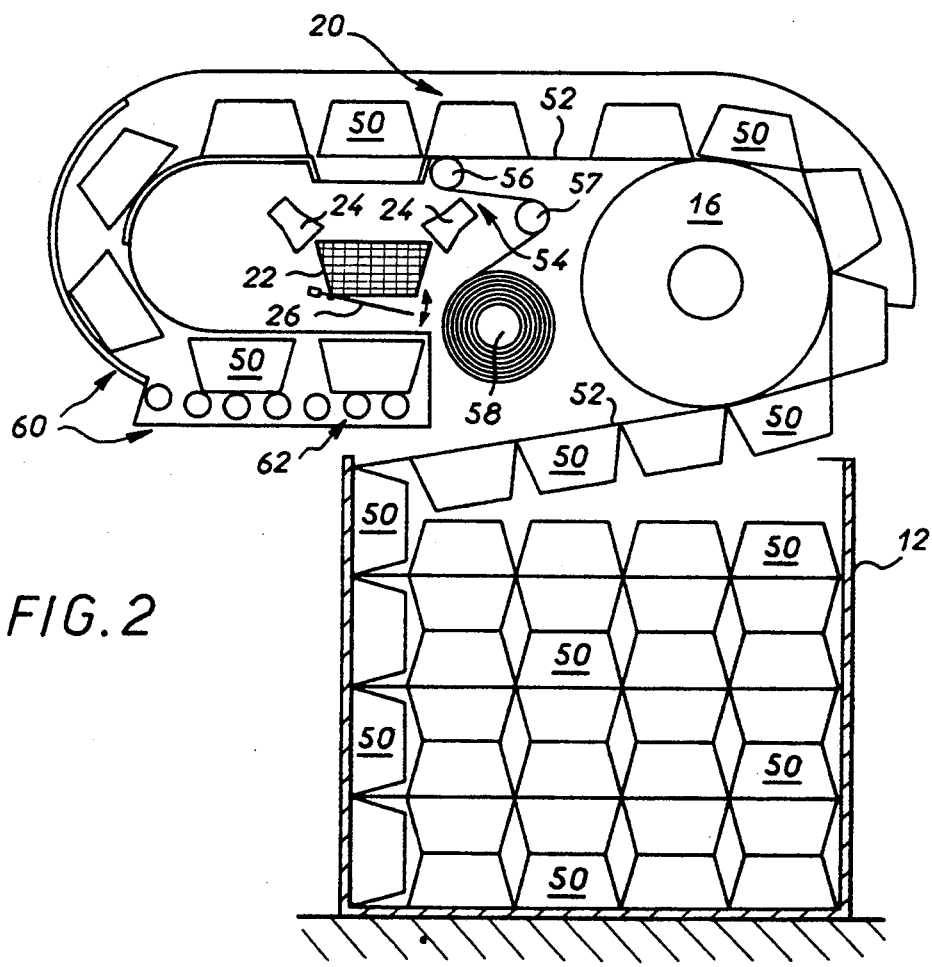
FIG. 2 is a view analogous to FIG. 1 showing an alternative embodiment.

In FIG. 2, structural members analogous to those of FIG. 1 are identified by the same reference numbers. They are a feed drum 16, a receptacle 22, an evacuation mechanism 26 and hot air heating means 24. However, the container is filled with a chain of packages comprising trays 50 joined together by a "peel-off" tape 52. This is a heat-bonded tape, for example, and constitutes the lid of each of the trays in the chain. The means for opening these containers essentially comprise a mechanism 54 for peeling off the tape disposed on the path 20 of the trays on the upstream side of the receptacle 22. To be more precise, this mechanism constitutes means on which the "peel-off" tape 52 is wound comprising a peeling roller 56 in the immediate vicinity of the receptacle 22 and a guide roller 57 and a take-up roller 58 above the receptacle. The chain of packages is naturally installed on the feed drum in such a way that the trays are upside down when the near the aforementioned opening means and above the receptacle, as can be seen in the drawing. The device is completed by means 60 for guiding and/or feeding the trays which take them over when they are separated by peeling off the "peel-off" tape. These guide and/or feed means are disposed between the opening means, more specifically the peeling roller 56, and a location 62 under the evacuation mechanism 26, i.e., under the receptacle 22, so that each tray reaching this location can receive a portion of heated food. This location is of course accessible to the consumer so that he can take out the tray.

This embodiment therefore differs advantageously from the previous embodiment in that it is no longer necessary to supply the device with empty trays.

The trays 50 may be joined together by said "peel-off" tape 52 in a manner which optimizes their storage in a rectangular parallelpiped-shaped container and facilitates feeding of the chain by the feed drum 16.

Figure 3:
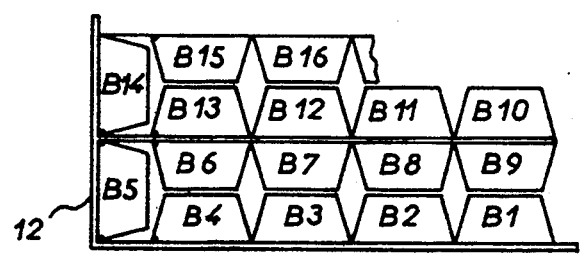
FIGS. 3 and 4 show a chain of trays usable with the device from FIG. 2, respectively folded up in a carton and unfolded.
Figure 4:
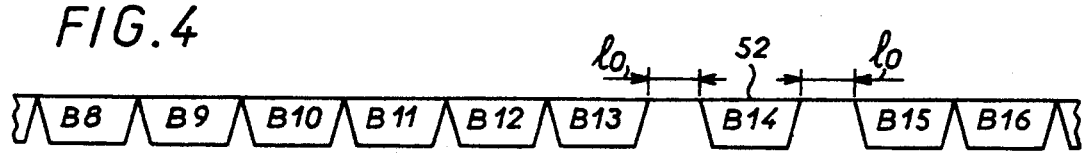

The trays of the chain of packages are in groups spaced longitudinally by sections $l_0$ of the "peel-off" tape 52, as shown in FIGS. 3 and 4. To be more precise, the trays are substantially twice as long as their height. The length of the container 12 is such that it can accommodate an integer number of trays horizontally plus one tray vertically. Accordingly, the chain of trays comprises groups consisting of trays articulated together edge-to-edge $B_1$-$B_4$, $B_6$-$B_{13}$, . . . by the "peel-off" tape, two such groups being separated by a tray $B_5$ or $B_{14}$ connected to each group by a sufficient length $l_0$ of the "peel-off" tape, as shown. In this way regular layers of trays may be disposed in the container and the greatest number of trays can be accommodated in a given space. This also facilitates removal of the chain of trays once it is fitted to the feed drum and the "peel-off" tape is attached to the winding means.

In each container 12, the chain of trays or sachets comprises a tape at each end. The tape at the trailing end of the chain is accessible so that it can be joined to the leader tape at the start of the next container. In this way it is possible to replenish the device before the container in service becomes empty. The device may be adapted to feed a plurality of necklaces containing respective different foods, some of which may be heated. Sausages could be dispensed with or without french fries, for example. Provision may also be made for dispensing sachets of condiments, preferably also in necklace form. Salt may be dispensed into the receptacle through a nozzle at the end of heating. Further modifications are feasible. Specifically, the receptacle may be vibrated or oscillated. Instead of having an opening bottom, it could be tipped to evacuate the food. Finally, the packages (13, 50) could be stored in a freezer or refrigerator.

There is claimed:

1. Apparatus for automatically dispensing food from respective packages of individual packages joined together in a form of a chain and enclosing individual food portions within the individual packages, comprising:

means for feeding the chain of packages along a predetermined path;

means for opening packages disposed at a predetermined location along the path;

a receptacle for receiving an individual food portion from an opened package;

means for heating an individual food portion associated with said receptacle, said means for heating comprising at least one hot air ejector nozzle directed towards said receptacle; and an evacuation mechanism for transferring a heated, individual food portion to a location of a container.

2. The apparatus according to claim 1, wherein said evacuation mechanism comprises a selectively openable bottom of said receptacle.

3. Apparatus for automatically dispensing food from respective packages of individual packages joined together in a form of a chain and enclosing individual food portions within the individual packages, comprising:

means for feeding the chain of packages along a predetermined path;

means for opening packages disposed at a predetermined location along the path;

a receptacle for receiving an individual food portion from an opened package;

means for heating an individual food portion associated with said receptacle; and an evacuation mechanism for transferring a heated, individual food portion to a location of a container, said evacuation mechanism comprising a selectively openable bottom of said receptacle.

4. Apparatus for automatically dispensing food from respective individual sachets joined together end-to-end in a form of a chain and enclosing individual food portions within the individual sachets, comprising:

- means for feeding the chain of sachets along a predetermined path;
- means for opening sachets disposed at a predetermined location along the path, said means for opening comprising a cutting member positioned near and above said receptacle to longitudinally open the sachets;
- a receptacle for receiving an individual food portion from an opened package;
- means for heating an individual food portion associated with said receptacle; and
- an evacuation mechanism for transferring a heated, individual food portion to a location of a container.

5. The apparatus according to claim 4, wherein said evacuation mechanism comprises a selectively openable bottom of said receptacle.

6. The apparatus according to claim 4, wherein said means for opening separates the chain of sachets into two parts, and further comprise deflectors positioned above said receptacle to separate the two parts of the chain of packages following longitudinal cutting of the sachets, and to facilitate tipping of food into said receptacle.

7. The apparatus according to claim 6, further comprising, downstream of said means for opening, a drum onto which are to be wound empty sachets, still joined end to end.

8. Apparatus for automatically dispensing food from respective individual trays joined together in a form of a chain by a tape comprising lids of each of the trays, so that individual food portions are enclosed within each tray, comprising:

- means for feeding the chain of trays along a predetermined path;
- a receptacle for receiving an individual food portion from an opened tray;
- a mechanism for peeling tape from the trays to open respective individual trays, said mechanism being positioned on said predetermined path upstream of said receptacle;
- means for heating an individual food portion associated with said receptacle; and
- an evacuation mechanism for transferring a heated, individual food portion to a location of a container.

9. The apparatus according to claim 8, wherein said evacuation mechanism comprises a selectively openable bottom of said receptacle.

10. The apparatus according to claim 8, wherein said mechanism for peeling tape comprises take-up winding elements for the tape.

11. The apparatus according to claim 8, wherein said means for feeding drives the chain of trays along said predetermined path so that the trays are upside down on nearing said mechanism for peeling tape and positioned above said receptacle.

12. The apparatus according to claim 8, further comprising means for at least one of guiding and feeding trays after removal of the tape to a position between said mechanisms for peeling and said evacuation mechanism to recover heated food portions in the trays from which food portions were initially removed.

* * * * *